United States Patent [19]
Brocard et al.

[11] Patent Number: 6,125,826
[45] Date of Patent: Oct. 3, 2000

[54] SELF-WASHING DEVICE FOR SEPARATING AND FILTERING SOLID PARTICLES FROM A FLOW OF LIQUID, AND USE OF THE DEVICE IN A FUEL INJECTION CIRCUIT

[75] Inventors: Jean-Marie Brocard, Rubelles; Michel François Le Texier, Epinay Sous Senart; Alain Sartori, Le Mee sur Seine, all of France

[73] Assignee: Societe Nationale d'Etude et de Construction de Moteurs d'Aviation, Paris, France

[21] Appl. No.: 09/212,864

[22] Filed: Dec. 17, 1998

[30] Foreign Application Priority Data

Dec. 18, 1997 [FR] France .................................... 97 16058

[51] Int. Cl.⁷ ...................................................... F02M 37/04
[52] U.S. Cl. ........................................... 123/510; 210/304
[58] Field of Search ........................ 137/808; 123/198 R; 210/304, 308, 311, 312, 321.75, 321.76, 321.78

[56] References Cited

U.S. PATENT DOCUMENTS

| | | |
|---|---|---|
| 3,053,391 | 9/1962 | Nelson . |
| 3,481,474 | 12/1969 | Paulson . |
| 3,718,258 | 2/1973 | Sharpe . |
| 3,807,568 | 4/1974 | Ruthrof . |
| 3,828,930 | 8/1974 | Eimer et al. . |
| 5,575,909 | 11/1996 | Foster ....................................... 210/304 |
| 5,972,215 | 10/1999 | Kammel .................................. 210/304 |

*Primary Examiner*—Thomas N. Moulis
*Attorney, Agent, or Firm*—Oblon, Spivak, McClelland, Maier & Neustadt, P.C.

[57] ABSTRACT

A self-washing device for separating and filtering solid particles from a flow of liquid includes a tubular casing defining an internal chamber, a tangential liquid inlet opening into the internal chamber and arranged to create a vortex in the internal chamber which acts to centrifuge out solid particles and carry them at the vortex periphery, a tangential liquid outlet for discharge of liquid carrying the solid particles from the internal chamber, and a tubular filter disposed longitudinally within the internal chamber for taking and filtering a portion of liquid flow at a center of the vortex, the filter having a longitudinal central duct communicating with at least one longitudinal liquid outlet for the filtered liquid. The device is of particular use in a fuel injection circuit.

7 Claims, 3 Drawing Sheets

SELF-WASHING DEVICE FOR SEPARATING AND FILTERING SOLID PARTICLES FROM A FLOW OF LIQUID, AND USE OF THE DEVICE IN A FUEL INJECTION CIRCUIT

BACKGROUND OF THE INVENTION

1. Field of the Invention

The invention relates to a self-washing device for separating and filtering solid particles from a flow of liquid, and to the use of the device in a fuel injection circuit.

2. Description of the Prior Art

In many systems using high pressure liquids, the liquid must be thoroughly filtered to prevent wear due to contaminants present in the liquid. Conventionally this requirement is met by a filter cartridge which can be replaced when it is clogged. It is also conventional to provide a by-pass valve through which the liquid can flow when the filter cartridge is clogged. The state of the filter must therefore be checked regularly to prevent rapid deterioration of the costly equipment which the filter is intended to protect.

In the particular case of a system for feeding and metering the fuel in a turbomachine, the system including a gear pump, for example of the positive displacement kind, a flow-metering device and fuel injectors, it is necessary to protect the system from external contamination originating from the fuel tanks and to protect the metering device and injectors from contamination by wear particles produced by and possibly even damaging the pump. However, this double protection cannot be provided by a single filter. Also, the use of two filters placed one upstream and one downstream of the pump makes installation difficult, increases engine weight, requires additional maintenance operations and makes operation difficult due to the high pressures downstream of the pump. Furthermore, these systems introduce appreciable pressure drops which increase proportionally as the filter becomes increasingly clogged.

To avoid the problem of having to maintain the filter disposed downstream of the pump, a self-washing filter can be used. Known self-washing filters usually comprise a filter cartridge having a central duct through which the main proportion of the fuel flow passes. To supply the fuel metering and fuel injection devices some of the fuel is drawn from the central duct of the filter and filtered through the filter cartridge. The disadvantage of these known self-washing filters is that in order for the washing to be effective they can filter only a small proportion of the total fuel flow entering the filter. The filtered fuel flow is usually less than 10% of the total fuel flow entering the filter. Consequently, the greater the fuel flow to be filtered is, the greater the filter cartridge area must be. The known self-washing filters therefore tend to be heavy and bulky.

SUMMARY OF THE INVENTION

It is an object of the invention to provide a self-washing device for separating and filtering solid particles from a flow of liquid, the device being of reduced bulk and weight and enabling the ratio of the quantity of filtered liquid flow to the quantity of liquid flow entering the device to be increased while still providing effective washing of the filter.

To this end, the invention provides a self-washing device for separating and filtering solid particles from a flow of liquid, comprising:

- a tubular casing having a peripheral wall, a first end wall, and a second end wall;
- an internal chamber bounded by the walls of said casing;
- a tubular filter disposed longitudinally within said internal chamber between said first and second end walls of said casing, said tubular filter having a longitudinal central duct;
- a tangential liquid inlet opening into said internal chamber near the first end wall of said casing so as to create a liquid vortex in said internal chamber around said tubular filter whereby solid particles are separated out centrifugally and propelled at the periphery of the vortex, and a portion of the liquid at the center of the vortex passes through said tubular filter into said longitudinal central duct;
- a tangential liquid outlet from said internal chamber near the second end wall of said casing for the discharge of liquid carrying the solid particles; and
- at least one longitudinal liquid outlet from said longitudinal central duct for the discharge of liquid filtered by said tubular filter.

The invention thus provides a self-washing separating and filtering device in which the densest solid particles are centrifuged out to prevent overpollution of the filter, the separated solid particles passing directly to the tangential outlet of the device. The liquid which flows through the filter contains only residual low-density solid particles, and of these only a minority stay trapped on the surface of the filter, the majority being entrained and carried away by the speed of the fluid parallel to the filter surface.

The self-washing device of the invention is particularly suitable for use in a fuel injection circuit including a high pressure pump, a main filter upstream of said high pressure pump, a fuel-metering device downstream of said high pressure pump, and a return duct including a by-pass valve leading from between said high pressure pump and said fuel metering device to a position upstream of the main filter. In this case the tangential liquid inlet of the device is connected to receive the output from the high pressure pump, the tangential liquid outlet is connected to deliver to the return duct, and the longitudinal liquid outlet is connected to deliver to the fuel-metering device.

Other advantages and preferred features of the invention will become apparent from the following description of the preferred embodiments, given by way of a nonlimiting example, with reference to the accompanying drawings.

DESCRIPTION OF THE PREFERRED EMBODIMENTS

Figure 1:
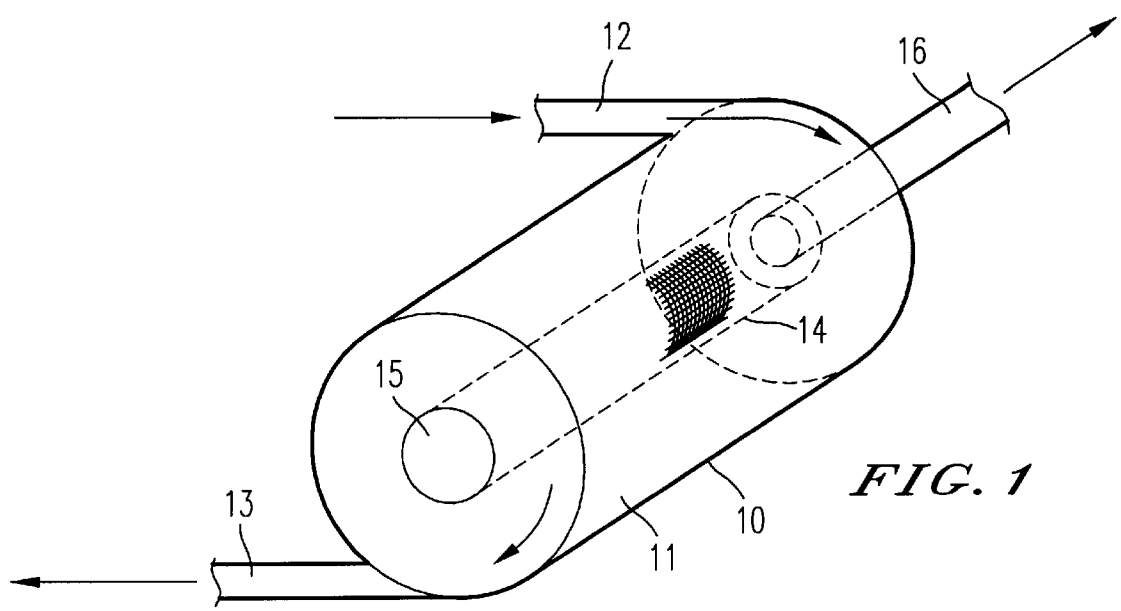
FIGS. 1 is a diagrammatic perspective view of a first embodiment of a self-washing separating and filtering device in accordance with the invention.
Figure 2:
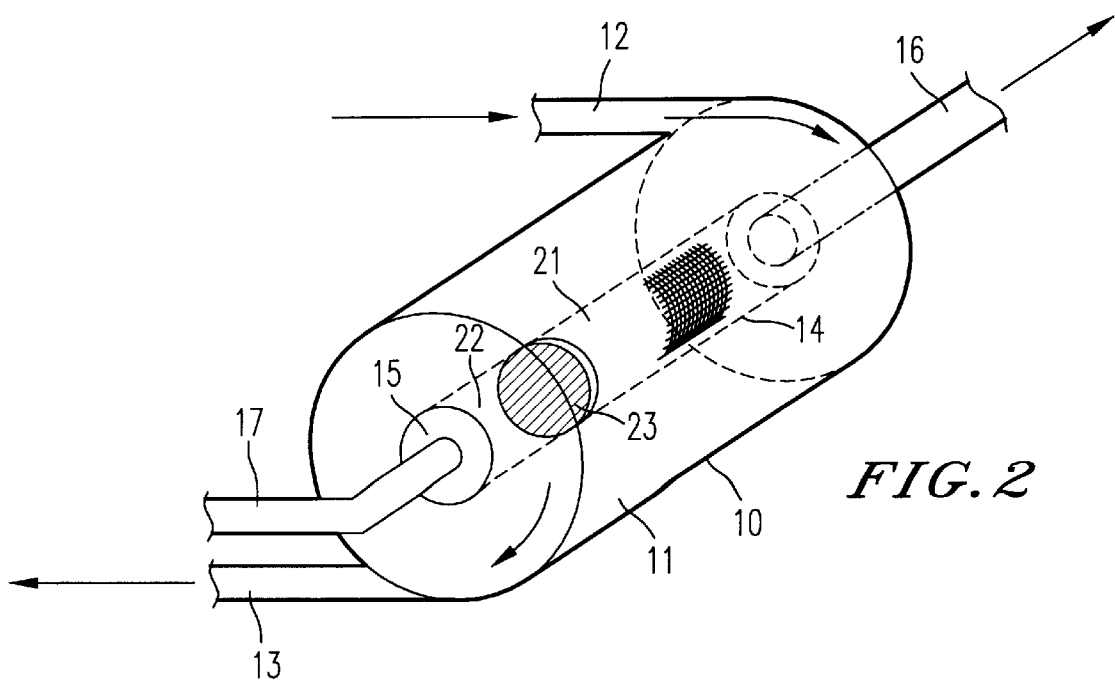
FIG. 2 is a diagrammatic perspective view of a second embodiment of a self-washing separating and filtering device in accordance with the invention.

In each of the embodiments shown in FIGS. 1 and 2, the self-washing separating and filtering device of the invention comprises a tubular casing 10 having a peripheral wall, a first end wall and a second end wall, an internal chamber 11 bounded by the casing walls, a tangential liquid inlet 12 opening into the chamber 11 near the first end wall of the casing 10, and a tangential liquid outlet 13 near the second end wall of the casing 10. A tubular filter 14 made of cloth or other suitable filter material is disposed longitudinally in the chamber 11 between the two end walls. The filter 14 has a longitudinal central duct 15 communicating with at least one longitudinal filtered liquid outlet 16 which is disposed in the first end wall and/or the second end wall of the casing 10.

The tangential configuration of the liquid inlet 12 serves to produce a vortex in the chamber 11 which acts to centrifuge out the heaviest solid particles and carry them towards the tangential outlet 13. The liquid which flows through the filter contains only low density residual particles so that excessive pollution of the filter is avoided and the ratio of filtered liquid flow to incoming liquid flow can be increased without increasing the size of the self-washing separating and filtering device.

Figure 3:
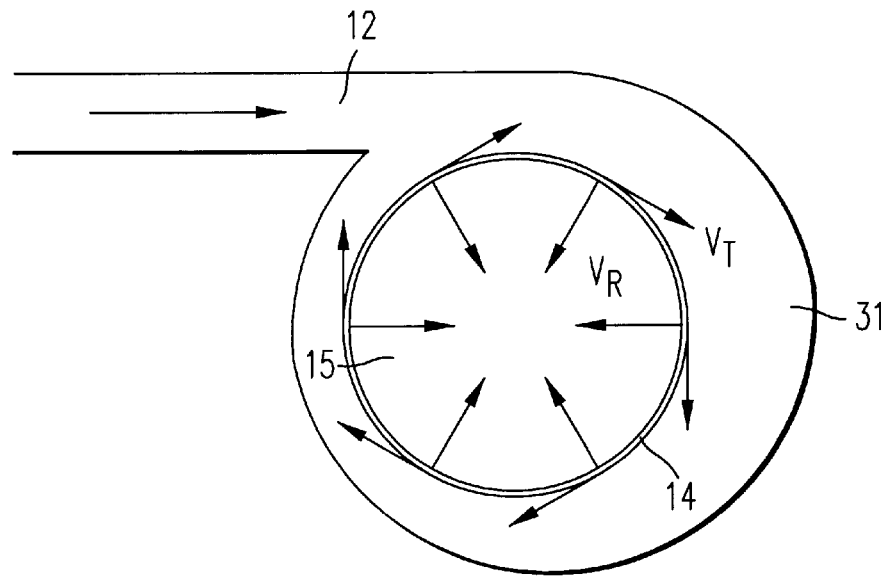
FIG. 3 is a diagrammatic cross-sectional view of a third embodiment of a self-washing separating and filtering device in accordance with the invention.

In the embodiment shown in FIG. 3, the inside surface of the casing is spiral-shaped near the tangential liquid inlet 12 so as to form a volute 31. This shape makes it possible to maintain the radial flow velocity VR and the tangential flow velocity VT of the liquid around the filter 14 substantially constant, thus ensuring a uniform distribution of the filtered liquid flow over the whole lateral surface of the filter and a uniform distribution of the tangential washing speed VT in order to obviate the presence of contaminant accumulation zones.

Figure 4:
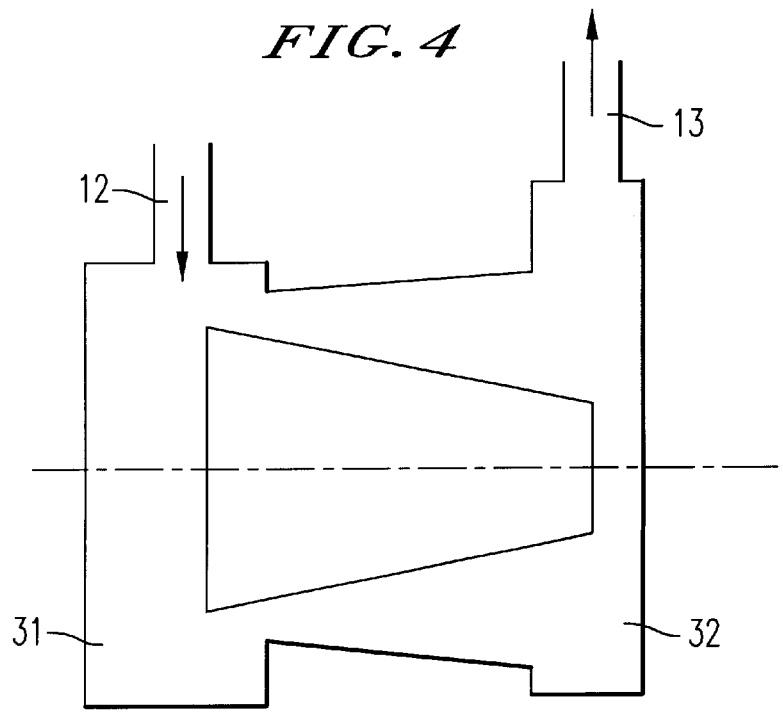
FIG. 4 is a diagrammatic longitudinal sectional view of the third embodiment shown in FIG. 3.

The internal surface of the casing shown in FIG. 4 is also spiral-shaped near the tangential liquid outlet 13 so as to form a volute 32 which is of inverted shape relative to the shape of the inlet volute 31. This facilitates the discharge of the solid particles towards the tangential outlet 13.

Advantageously, the inlet 12 can be an aperture of reduced thickness which takes up the entire length of the casing to ensure that the vortex rotates at a uniform speed throughout the chamber.

As also shown in FIG. 4, the internal cross-section of the casing may increase, and the internal cross-section of the filter 14 may decrease, between the inlet volute 31 and the outlet volute 32 in order to minimize pressure drops in the liquid flow between the tangential liquid inlet 12 and the tangential liquid outlet 13.

As shown in FIG. 2, a device in accordance with the invention for use in a fuel feed circuit including a fuel injection device for which the fuel flow may be filtered coarsely, for example to 300 μm, and servo devices for which the fuel flow must be finely filtered, for example to between 70 and 100 μm, preferably has the filter 14 provided with two filtration zones 21, 22 disposed end to end and having different stopping powers. The two zones 21 22 are both situated in the internal chamber 11 of the casing 10 and are separated by a fluid tight partition 23. The first filtration zone 21 provides the coarser filtration and bounds a first portion of the longitudinal central duct 15 which leads into a first longitudinal filtered liquid outlet 16 disposed in the first end wall of the casing 10 and adapted to be connected to the fuel injection device. The second filtration zone 22 provides finer filtration and bounds a second portion of the longitudinal central duct 15 which leads into a second longitudinal filtered liquid outlet 17 disposed in the second end wall of the casing 10 and adapted to be connected to the servo devices.

In operation a flow of liquid containing solid particles which are to be separated and filtered out is delivered at high pressure into the internal chamber 11 of the casing 10 through the tangential inlet 12 at a tangential speed VT relative to the filter 14. The liquid flow is driven into a helical motion creating a vortex in the chamber 11 between the filter 14 and the peripheral wall of the casing 10. The densest solid particles contained in the liquid flow are centrifuged outwards towards the outside of the vortex and are carried thereby along the peripheral wall of the casing 10 towards the second end wall thereof. These dense solid particles are mostly discharged directly through the tangential liquid outlet 13. The liquid flow from which the densest solid particles have been removed but which still contains residual fine solid particles is driven at the center of the vortex at a high tangential speed relative to the surface of the filter.

A first part of the liquid flow at the center of the vortex passes through the meshes of the filter material, leaving the residual solid particles trapped on the surface of the filter 14. This filtered liquid thus passes into the longitudinal central duct 15 of the filter 14 and is then directed towards the longitudinal filtered liquid outlet 17. The second part of the liquid flow at the center of the vortex is directed towards the tangential liquid outlet 13 at a tangential speed which is high relative to the filter surface. On its way this second part of the liquid flow removes the fine particles trapped on the filter surface and carries them towards the tangential liquid outlet 13, so that the filter 14 is continuously being washed all the time that the separating and filtering device is in operation. The second part of the unfiltered liquid flow also gradually drives the densest solid particles propelled to the outside of the vortex towards the tangential liquid outlet 13.

Separating the contaminating particles by centrifuging serves to distance such particles from the filter 14 and to increase the liquid flow through the filter in relation to the filter washing flow while still providing effective washing. Enhancing the washing effect by the separating effect helps to provide up to a 50% increase in the ratio of filtered flow to incoming flow without increasing the dimensions of the filter surface. The separating and filtering device thus helps to reduce weight and bulk, and also reduces the need for checking or maintenance work.

Figure 5:
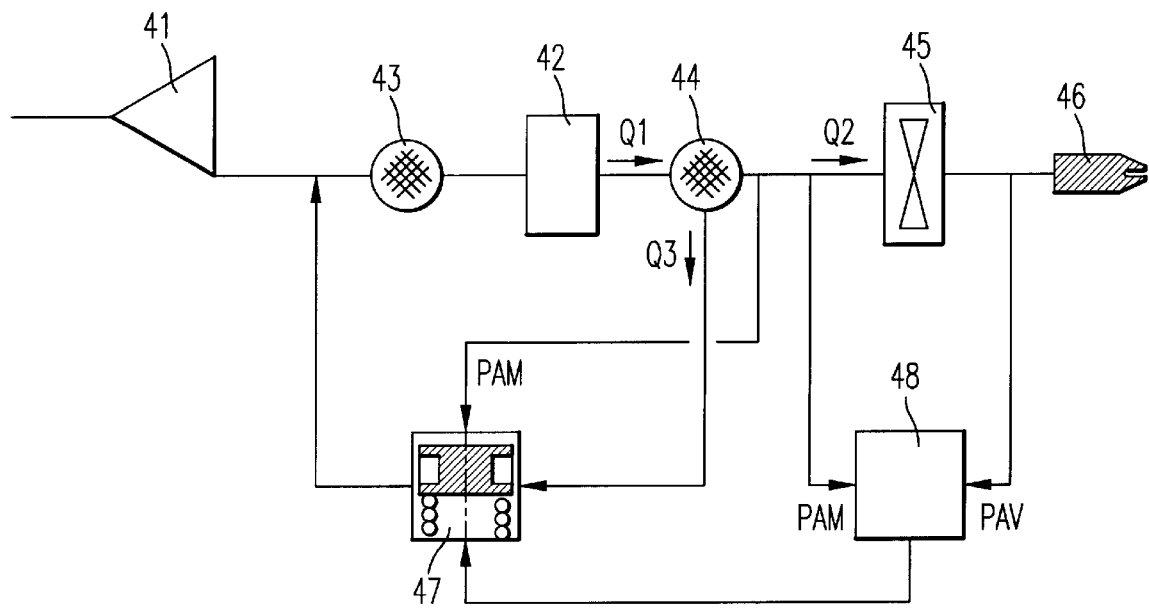
FIG. 5 is a circuit diagram illustrating one example of a fuel injection circuit incorporating a self-washing separating and filtering device in accordance with the invention.

FIG. 5 is a diagram showing one example of how the separating and filtering device may be used in a fuel injection circuit.

The fuel injection circuit comprises a low pressure pump 41 which receives fuel from a feed pump (not shown) disposed in a fuel tank. This fuel flow is delivered by the pump 41 through a main filter 43 to a high pressure pump 42. Downstream of the high pressure pump 42 the fuel flow Q1 is delivered to the tangential liquid inlet of a self-washing separating and filtering device 44 in accordance with the invention. The longitudinal filtered liquid outlet of the device 44 provides a filtered fuel flow Q2 to a fuel metering device 45 in order to obtain a metered filtered fuel flow to fuel injectors 46. The remainder of the fuel flow Q1 delivered to the device 44 is discharged from the tangential liquid outlet as a flow Q3, taking with it all the solid particles which have been centrifuged out and all the particles trapped and washed from the filter surface. The fuel flow Q3 is returned through a bypass valve 47 to a position upstream of the main filter 43. Opening of the bypass valve 47 is controlled by a differential pressure detector 48 connected across the metering device 45. A signal output by the differential pressure detector 48 operates to control the valve 47 so as to maintain the pressure difference PAV-PAM constant across the metering device 45.

Servo devices are not present in the fuel injection circuit of FIG. 5 and the self-washing device 44 is constructed in the manner shown in FIG. 1. If the fuel injection circuit includes servo devices, the self washing device 44 will be constructed in the manner shown in FIG. 2.

What is claimed is:

1. A self-washing device for separating and filtering solid particles from a flow of liquid, comprising:

a tubular casing having a peripheral wall, a first end wall, and a second end wall;

an internal chamber bounded by the walls of said casing;

a tubular filter disposed longitudinally within said internal chamber between said first and second end walls of said casing, said tubular filter having a longitudinal central duct;

a tangential liquid inlet opening into said internal chamber near the first end wall of said casing so as to create a liquid vortex in said internal chamber around said tubular filter, whereby solid particles are separated out centrifugally and propelled at a periphery of the liquid vortex, and a portion of the liquid at a center of the vortex passes through said tubular filter into said longitudinal central duct;

a tangential liquid outlet leading from said internal chamber near the second end wall of said casing for discharge of liquid carrying the solid particles; and at least one longitudinal liquid outlet from said longitudinal central duct for discharge of liquid filtered by said tubular filter;

wherein said casing has a spiral-shaped internal surface defining an inlet volute adjacent said tangential liquid inlet.

2. A self-washing device according to claim 1, wherein said casing has a further spiral-shaped internal surface defining an outlet volute adjacent said tangential liquid outlet.

3. A self-washing device according to claim 2, wherein an internal cross-section of said casing increases between the inlet volute and the outlet volute, and an internal cross-section of said tubular filter decreases between said inlet volute and said outlet volute.

4. A self-washing device according to claim 1, wherein said tubular filter includes a first filtration zone and a second filtration zone having different stopping powers, wherein said longitudinal central duct has a first portion in said first filtration zone and a second portion in said second filtration zone, wherein a first longitudinal liquid outlet is provided in the first end wall of the casing for discharge of filtered liquid from said first portion of said longitudinal central duct, and wherein a second longitudinal liquid outlet is provided in said second end wall of the casing for discharge of filtered liquid from said second portion of said longitudinal central duct.

5. A self-washing device according to claim 4, wherein said first and second portions of said longitudinal central duct are separated by a fluid-tight partition between said first and second filtration zones.

6. A self-washing device according to claim 1 in a fuel injection circuit including a high pressure pump, a main filter upstream of said high pressure pump, a fuel metering device downstream of said high pressure pump, and a return duct including a by-pass valve leading from one position between said high pressure pump and said fuel-metering device to another position upstream of said main filter, wherein said tangential liquid inlet of said self-washing device is connected to receive output from said high pressure pump, wherein said tangential liquid outlet is connected to deliver a remainder of fuel flow to said return duct, and wherein said longitudinal liquid outlet is connected to deliver a filtered fuel flow to said fuel-metering device.

7. A self-washing device according to claim 5 in a fuel injection circuit including servo-devices, a high pressure pump, a main filter upstream of said high pressure pump, a fuel metering device downstream of said high pressure pump, and a return duct including a by-pass valve leading from one position between said high pressure pump and said fuel-metering device to another position upstream of said main filter, wherein said tangential liquid inlet of said self-washing device is connected to receive output from said high-pressure pump, wherein said tangential liquid outlet is connected to deliver a remainder of fuel flow to said return duct, wherein said first longitudinal liquid outlet is connected to deliver a filtered fuel flow to said fuel-metering device, and wherein said second longitudinal liquid outlet is connected to deliver a metered and filtered fuel flow to said servo-devices.

* * * * *

UNITED STATES PATENT AND TRADEMARK OFFICE
CERTIFICATE OF CORRECTION

PATENT NO. : 6,125,826

DATED : October 3, 2000

INVENTOR(S): Jean-Marie Brocard et al.

It is certified that an error appears in the above-identified patent and that said Letters Patent is hereby corrected as shown below:

Col. 3, line 33, after "This", insert --shape--; and line 41, delete "14".

Col. 4, line 33, after "filter", insert --14--.

Signed and Sealed this

Twenty-second Day of May, 2001

Attest:

Attesting Officer

NICHOLAS P. GODICI

Acting Director of the United States Patent and Trademark Office